(12) United States Patent
Wang et al.

(10) Patent No.: US 12,467,561 B1
(45) Date of Patent: Nov. 11, 2025

(54) EASY FOLDING WATER PIPE DEVICE

(71) Applicant: HUNG CHENG RIBBON ENTERPRISES CO., LTD, Changhua County (TW)

(72) Inventors: Chi An Wang, Changhua County (TW); Pei An Wang, Changhua County (TW)

(73) Assignee: HUNG CHENG RIBBON ENTERPRISES CO., LTD, Changhua County (TW)

( * ) Notice: Subject to any disclaimer, the term of this patent is extended or adjusted under 35 U.S.C. 154(b) by 0 days.

(21) Appl. No.: 18/736,203

(22) Filed: Jun. 6, 2024

(30) Foreign Application Priority Data

May 9, 2024 (TW) .................................. 113117167

(51) Int. Cl.
*F16L 11/04* (2006.01)
*F16L 11/12* (2006.01)

(52) U.S. Cl.
CPC ............. *F16L 11/042* (2013.01); *F16L 11/12* (2013.01)

(58) Field of Classification Search
CPC .......... F16L 11/12; F16L 11/042; F16L 11/00; F16L 11/085
See application file for complete search history.

(56) References Cited

U.S. PATENT DOCUMENTS

| 3,021,871 | A | * | 2/1962 | Rodgers | |
| 3,245,431 | A | * | 4/1966 | Coe | |
| 5,964,412 | A | * | 10/1999 | Thomas | F16L 11/12 |
| 2002/0000720 | A1 | * | 1/2002 | Knowles | |
| 2003/0192611 | A1 | * | 10/2003 | Weck | F16L 11/12 |
| 2006/0151038 | A1 | * | 7/2006 | Gregrich | F16L 11/12 |
| 2024/0401724 | A1 | * | 12/2024 | Yeiser, IV | F16L 11/12 |

FOREIGN PATENT DOCUMENTS

| GB | 2611497 A | * | 4/2023 | ............. F16L 11/12 |
| TW | M593496 U | | 4/2020 | |
| TW | I783970 B | | 11/2022 | |

OTHER PUBLICATIONS

An Office Action issued by Taiwan Intellectual Property Office on Oct. 11, 2024, which corresponds to Taiwanese Patent Application No. 113117167 and is related to U.S. Appl. No. 18/736,203; with English language translation.

* cited by examiner

*Primary Examiner* — William S. Choi
(74) *Attorney, Agent, or Firm* — Studebaker Brackett PLLC (57) ABSTRACT

An easy folding water pipe device includes an inner tube, an outer tube and a connector structure. The outer tube wraps around an outer circumference of the inner tube and consists of a first wrapping portion and a second wrapping portion with different modulus of elasticities. The connector structure has a first connector and a second connector, and the first and the second connectors respectively connect to two ends of the inner and the outer tubes. When the water pipe device is stretched by an external force, the first wrapping portion, the second wrapping portion and the inner tube are stretched simultaneously, and when the external force is released, the first wrapping portion is in a contracted state, causing the outer and the inner tubes to wind regularly. Therefore, the present invention has advantages such as easy folding and preventing tangling.

10 Claims, 7 Drawing Sheets

EASY FOLDING WATER PIPE DEVICE

TECHNICAL FIELD

The present disclosure relates to an easy folding water pipe device, and more particularly, to a structure with different modulus of elasticities on both sides, causing the inner tube and the outer tube to wind regularly during elastic contraction.

DISCUSSION OF THE BACKGROUND

Traditional fabric water pipes are divided into expandable water pipes and non-expandable water pipes. The expandable water pipes consist of inner tubes and outer tubes wrapping around the inner tubes. The inner tubes can elastically stretch and contract in the axial direction, and the outer tubes are constituted by inelastic materials. For example, the outer tubes are weave structures formed by yarns passing each other. Therefore, the actual lengths of the outer tubes are greater than the actual lengths of the inner tubes. When the expandable water pipes are stretched by an external force, the inner tubes are simultaneously stretched by the external force, and the outer tubes, by wrapping around the inner tubes, also stretched accordingly, thereby the expandable water pipes can reach different ranges for spraying work.

For the abovementioned expandable water pipes and non-expandable water pipes, the main function of the outer tubes is to restrict the axial and/or radial variations of the inner tubes due to the levels of water pressure. In other words, as mentioned above, when the expandable water pipes and the non-expandable water pipes are performing spraying tasks, the inner tubes will undergo axial and/or radial variations due to the level of water pressure. The outer tubes further restrict the variations of the inner tubes, and even the appearances of the outer tubes remain unchanged regardless of the levels of water pressure.

However, the expandable water pipes and non-expandable water pipes are prone to tangling and knotting when in use (such as doing spraying work) and when not in use (such as being placed on the ground), resulting in inconvenient use and difficulty in storage. Although there are coiled PU water pipes available on the market, which can reduce the problems of tangling and knotting, they cannot withstand high water pressure and are prone to damage and other problems. To sum up, there is no water pipe on the market that combines resistance to high water pressure with convenience of use and easy storage.

SUMMARY

To overcome the abovementioned drawbacks, the present disclosure provides an easy folding water pipe device. The contraction of the first wrapping portion causes the second wrapping portion and the inner tube to wind regularly, thereby addressing several current issues.

The present disclosure is related to an easy folding water pipe device. The easy folding water pipe device includes an inner tube, an outer tube and a connector structure. The inner tube is made of elastic material and has a hollow interior. The outer tube wraps around an outer circumference of the inner tube, wherein the outer tube consists of a first wrapping portion and a second wrapping portion, the first wrapping portion and the second wrapping portion are connected to each other along a radial direction of the outer tube, and the first wrapping portion and the second wrapping portion have different modulus of elasticities. The connector structure has a first connector and a second connector, wherein the first connector connects to one ends of the inner tube and the outer tube, and the second connector connects to the other ends of the inner tube and the outer tube. When the water pipe device is stretched by an external force, the first wrapping portion, the second wrapping portion and the inner tube are stretched simultaneously, and when the external force is released, the first wrapping portion is in a contracted state, causing the outer tube and the inner tube to wind regularly, and an actual length of the second wrapping portion is greater than an actual length of the first wrapping portion.

Based on the above design, the present disclosure utilizes the characteristic of unilateral elastic contraction of the outer tube, which causes the outer tube and the inner tube to wind regularly during the contraction of the outer tube. Therefore, the likelihood of entanglement or intertwining of the water pipe during use is significantly reduced, effectively solving the problem of tangling or knotting of traditional expandable water pipes.

DETAILED DESCRIPTION

Referring to FIG. 1 to FIGS. 8, the present disclosure relates to an easy folding water pipe device 100. The easy folding water pipe device 100 includes an inner tube 10, an outer tube 20 and a connector structure 30.

Figure 2:
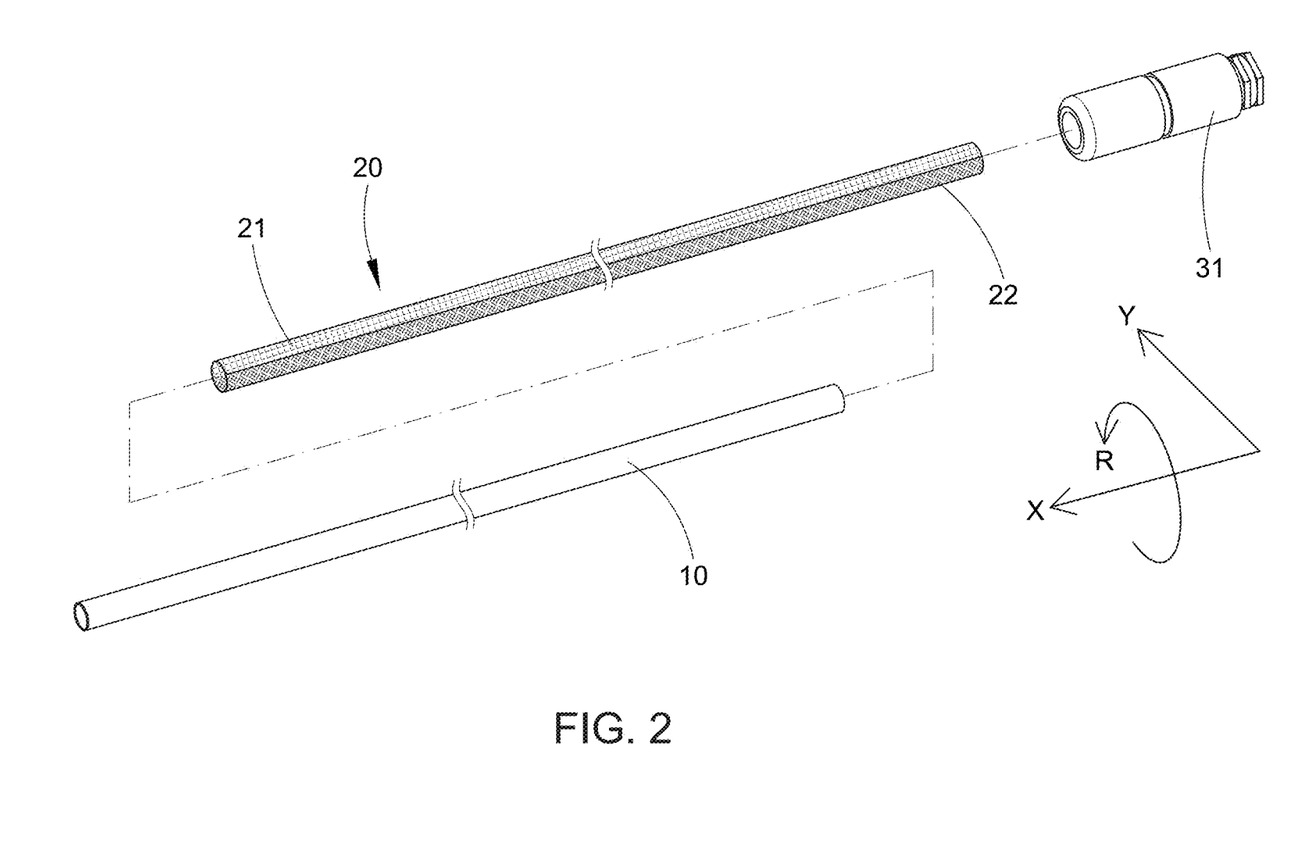
FIG. 2 is an exploded schematic view of the water pipe device of the present disclosure when it is stretched by an external force.

As shown in FIG. 2, the inner tube 10 is made of elastic material and has a hollow interior, in accordance with some embodiments. The elastic design of the inner tube 10 enables it to adapt to various usage scenarios. For example, when the inner tube 10 is subjected to water pressure inside the pipe, the inner tube 10 can expand along a radial direction Y to accommodate more water flow. Similarly, when an external tension is applied to the inner tube 10, the inner tube 10 can stretch along an axial direction X, and when the external tension is released, the inner tube 10 can contract along the axial direction X and automatically reset to adapt to different length requirements.

Figure 1:
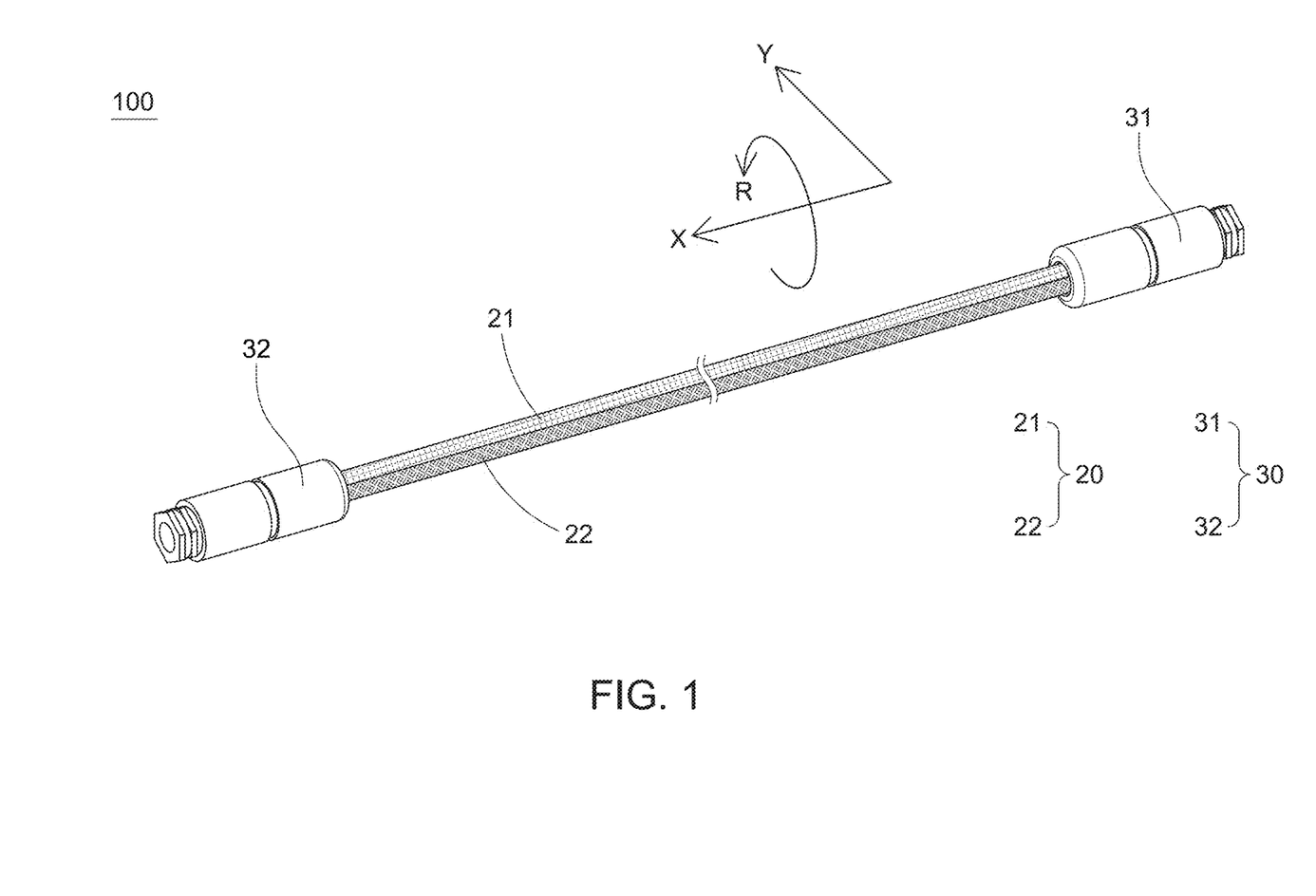
FIG. 1 is an appearance schematic view of a water pipe device of the present disclosure when it is stretched by an external force.
Figure 3:
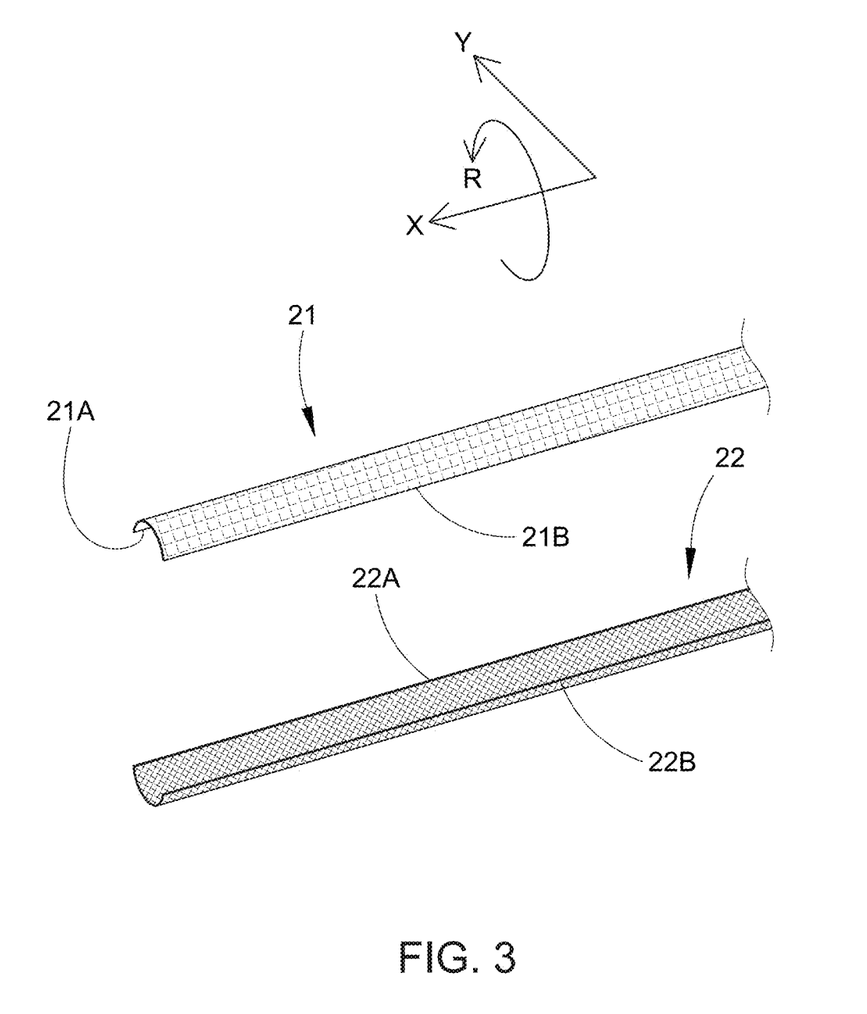
FIG. 3 is an exploded schematic view of an outer tube of the present disclosure when it is stretched by an external force.

As shown in FIG. 1 and FIG. 2, the outer tube 20 is wrapped around an outer circumference of the inner tube 10 to protect the inner tube 10 from damage by the external environment and to restrict changes in appearance due to the level of water pressure, in accordance with some embodiments. In some embodiments, the outer tube 20 is disposed outside of the inner tube 10 along a circumferential direction R. The outer tube 20 consists of a first wrapping portion 21 and a second wrapping portion 22. The first wrapping portion 21 and the second wrapping portion 22 are connected to each other along the radial direction Y of the outer tube 20 and are respectively located on opposite sides of the outer tube 20. In some embodiments, the "radial direction Y" is perpendicular to the "axial direction X." As shown in FIG. 2 and FIG. 3, in the present embodiment, the first wrapping portion 21 has a first lateral edge 21A and a second lateral edge 21B parallel to the axial direction X, the second wrapping portion 22 has a third lateral edge 22A and a fourth lateral edge 22B parallel to the axial direction X. The first lateral edge 21A of the first wrapping portion 21 and the third lateral edge 22A of the second wrapping portion 22 are connected to each other, and the second lateral edge 21B of the first wrapping portion 21 and the fourth lateral edge 22B of the second wrapping portion 22 are connected to each other, such that the first wrapping portion 21 and the second wrapping portion 22 collectively form a hollow tubular structure, which can be sleeved onto the outer circumference of the inner tube 10.

As shown in FIG. 1, the connector structure 30 has a first connector 31 and a second connector 32, in accordance with some embodiments. The first connector 31 connects to one ends of the inner tube 10 and the outer tube 20 along the axial direction X, and the second connector 32 connects to the other ends of the inner tube 10 and the outer tube 20 along the axial direction X, thereby achieving the connection between the inner tube 10 and the outer tube 20. For example, the connectors, the inner tube 10, and the outer tube 20 are clamped together through pipe clamps (the assembly of the connectors and tubes is known in the art and thus, not described in detail here). In some embodiments, the first connector 31 and the second connector 32 are quick release structures and can be quickly connected to the water inlet structure (such as a faucet) and the water outlet structure (such as a shower head or spray gun).

When the water pipe device is stretched by an external force, the outer tube 20 including the first wrapping portion 21 and the second wrapping portion 22 and the inner tube 10 are stretched simultaneously, and when the external force is released, the first wrapping portion 21 elastically contracts, simultaneously causing the outer tube 20 and the inner tube 10 to wind regularly. In this contracted state, an actual length of the second wrapping portion 22 is greater than an actual length of the first wrapping portion 21.

More specifically, in this embodiment, the first wrapping portion 21 and the second wrapping portion 22 have different modulus of elasticities, and the modulus of elasticity of the second wrapping portion 22 is greater than the modulus of elasticity of the first wrapping portion 21 ("modulus of elasticity" is a parameter indicating the rigidity of the material. The greater the modulus of elasticity, the tougher the material and the greater its ability to resist axial deformation). Therefore, both sides of the outer tube 20 exhibit different responses and deformation characteristics when subjected to external forces or upon release of external forces.

For example, in the manufacturing process of the first wrapping portion 21 and the second wrapping portion 22, an automated machine (such as a textile machine) is used to interweave axial yarns with radial yarns, combining them into a hollow narrow textile product with different appearances and weaving characteristics on the upper and lower sides, which ultimately forms the outer tube 20. In some embodiments, the axial yarns of the first wrapping portion 21 are stretchable elastic materials, and the axial yarns of the second wrapping portion 22 are materials that are not easily stretched and deformed (or materials with minimal stretch deformation).

In addition, in some embodiments, the inner tube 10 is cut and formed after the outer tube 20 is formed, and the inner tube 10 and the outer tube 20 are combined. In some embodiments, the formation of the inner tube 10 and the method of combining the inner tube 10 and the outer tube 20 includes straightening the outer tube 20 so that the first wrapping portion 21 is stretched from a first length to a second length, and the material of the inner tube 10 is cut to be equal to the second length of the outer tube 20 without being stretched or slightly stretched. Then, the outer tube 20 is sleeved onto the outer circumference of the inner tube 10 so that the two ends of the inner tube 10 and the outer tube 20 correspond to each other. After the inner tube 10 and the outer tube 20 are combined, the first connector 31 and the second connector 32 are respectively connected to the two ends of the inner tube 10 and the outer tube 20 (referring to FIG. 1), thereby forming the water pipe device 100 of the present disclosure.

Figure 4:
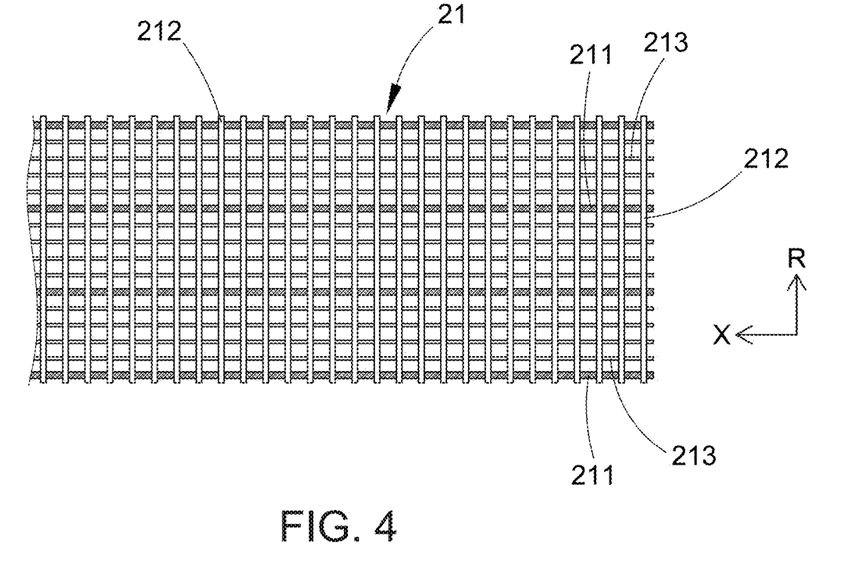
FIG. 4 is a schematic view of a first wrapping portion of the present disclosure.
Figure 5:
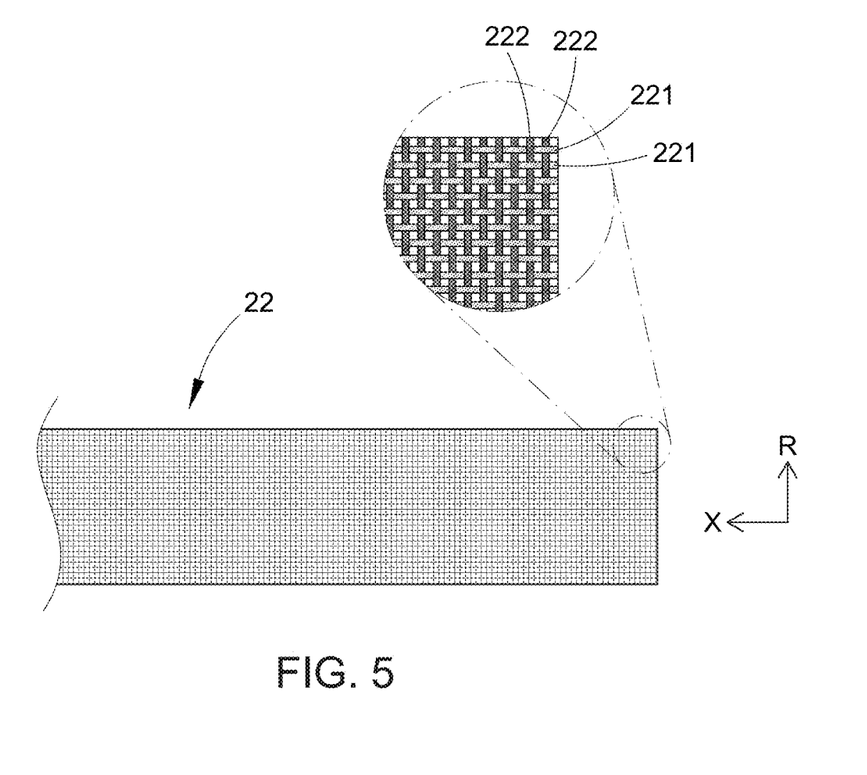
FIG. 5 is a schematic view of a second wrapping portion of the present disclosure.
Figure 6:
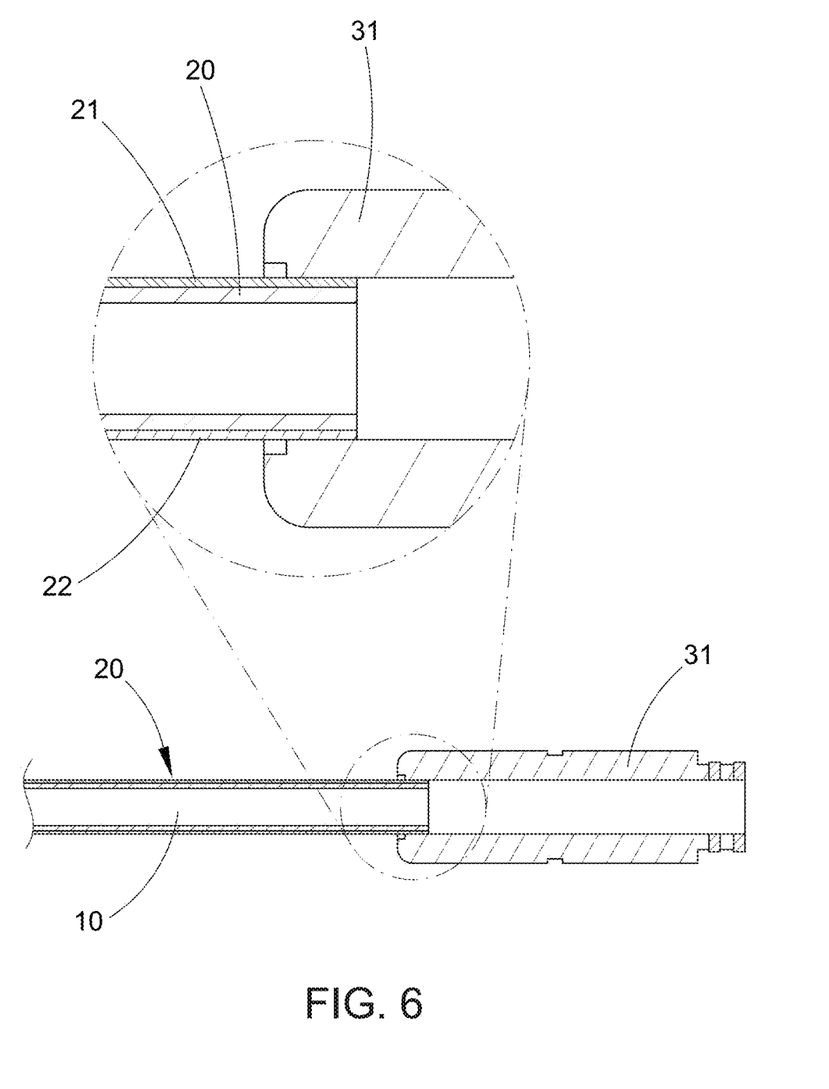
FIG. 6 is a partial cross-sectional view of the water pipe device of the present disclosure when it is stretched by an external force.

Referring to FIG. 4 and FIG. 5, in the present embodiment, the first wrapping portion 21 and the second wrapping portion 22 of the outer tube 20 are both woven from a plurality of intersecting yarns. In some embodiments, the first wrapping portion 21 is woven from a plurality of first warp yarns 211, a plurality of second warp yarns 213 and a plurality of first weft yarns 212, and the second wrapping portion 22 is woven from a plurality of third warp yarns 221 and a plurality of second weft yarns 222. In some embodiments, the first warp yarns 211 and the second warp yarns 213 of the first wrapping portion 21, and the third warp yarns 221 of the second wrapping portion 22 are arranged along the axial direction X of the outer tube 20, the first weft yarns 212 of the first wrapping portion 21 and the second weft yarns 222 of the second wrapping portion 22 are arranged along the circumferential direction R of the outer tube 20, and an interval between two adjacent first warp yarns 211 is greater than an interval between two adjacent second warp yarns 213.

Moreover, in the present embodiment, the first warp yarns 211 are elastic stretchable materials (such as elastic threads), which can provides flexibility for the first wrapping portion 21 to extend along the axial direction X of the outer tube 20, and the second warp yarns 213, the first weft yarns 212, the third warp yarns 221 and the second weft yarns 222 are inelastic materials, which can constrain the radial expansion of the outer tube 20. However, the disclosure is not limited thereto. In some embodiments, the third warp yarns 221 may be slightly elastic materials, and the axial deformation is much smaller than the axial deformation of the first warp yarns 211.

It should be appreciated that, due to the difference in elasticity of the warp yarns on both sides of the outer tube 20, the first warp yarns 211 of the first wrapping portion 21 are stretched when the outer tube 20 is stretched by an external force, and the first warp yarns 211 of the first wrapping portion 21 elastically contracts when the aforementioned external force is released, causing the second wrapping portion 22, which maintains its length (or slightly contracts), to wind regularly. As a result, the inner tube 10 winds with the outer tube 20, which is convenient for the user to roll and store the water pipe device.

Figure 7:
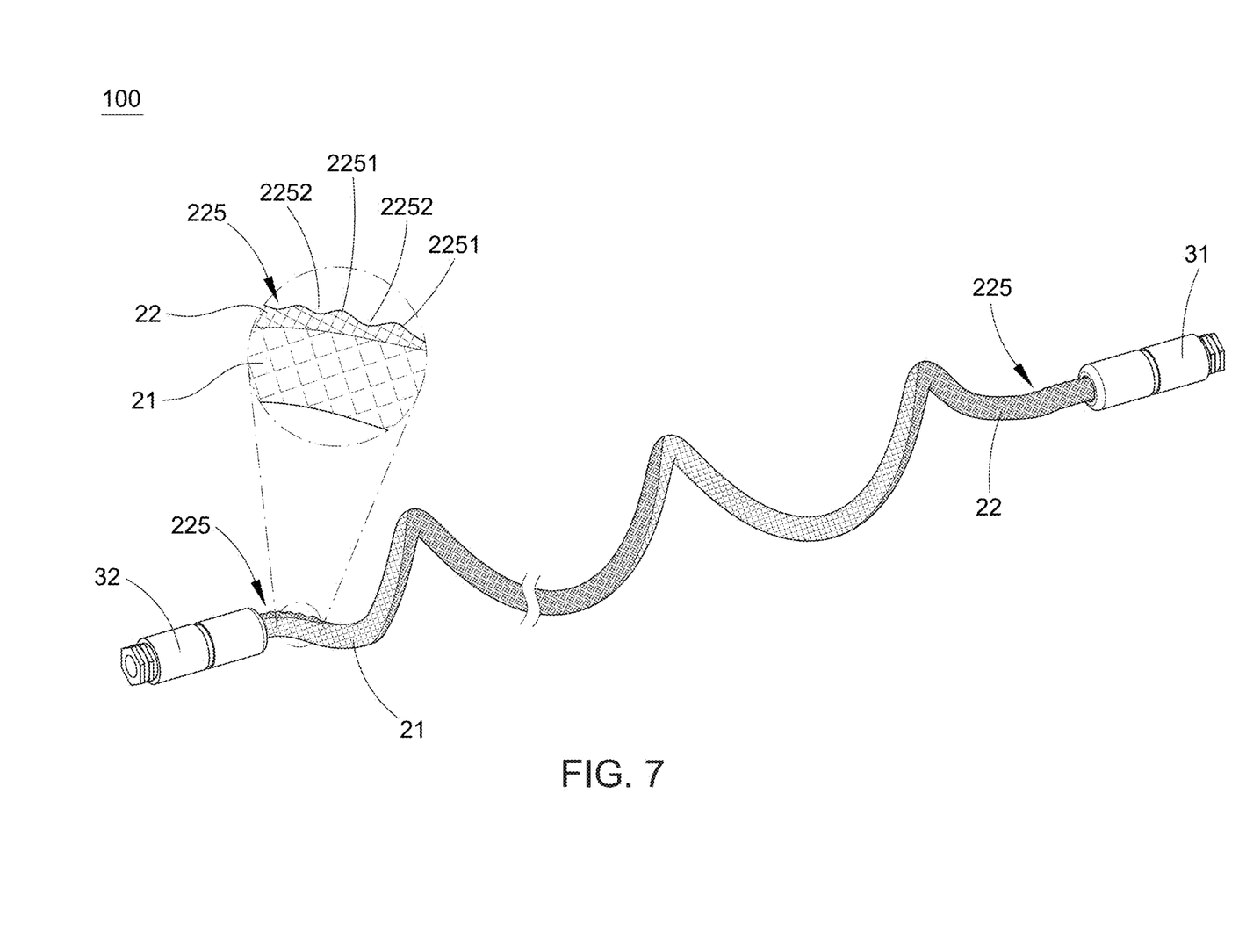
FIG. 7 is a schematic view of the water pipe device of the present disclosure when it is winding regularly.

More specifically, when the water pipe device 100 is in a state without tension or stretching, the actual length of the first wrapping portion 21 of the outer pipe 20 contracts from the second length to the first length due to the elasticity of the material, while the actual length of the inner pipe 10 and the actual length of the second wrapping portion 22 of the outer tube 20 remain unchanged (or only slightly contract). As a result, the contraction of the first wrapping portion 21 causes the water pipe device 100 to wind regularly. Moreover, when the first wrapping portion 21 contracts, the actual length of the second wrapping portion 22 remains unchanged because it cannot elastically contract. Therefore, at least a portion of the second wrapping portion 22 forms continuous wrinkles when the second wrapping portion 22 is regularly winded. As shown in FIG. 7, when the first wrapping portion 21 contracts, the second wrapping portion 22 has at least a wrinkle structure 225. In some embodiments, the wrinkle structure 225 has a plurality of bulges 2251 and a plurality of recesses 2252, and the bulges 2251 and the recesses 2252 are arranged in an alternating pattern.

As a result, when the water pipe device 100 is stretched by an external force, the first wrapping portion 21 of the outer tube 20 is stretched and deformed from a contracted state, and the inner tube 10 and the second wrapping portion 22 of the outer tube 20 are straightened (or slightly stretched) simultaneously, such that the portion of the second wrapping portion 22 of the outer tube 20 which has continuous wrinkles is stretched into a smooth shape. Moreover, when the first wrapping portion 21 is elastically stretched to reach a maximum length, the actual length of the first wrapping portion 21 is substantially equal to the actual length of the inner tube 10. When the external force is released, the first wrapping portion 21 is in a contracted state, the actual length of the inner tube 10 and the actual length of the second wrapping portion 22 of the outer tube 20 remain unchanged (or slightly contract). Therefore, the contraction of the first wrapping portion 21 causes the inner tube 10 and the second wrapping portion 22 of the outer tube 20 to wind regularly and automatically, which is convenient for the user to roll and store the water pipe device.

Figure 8:
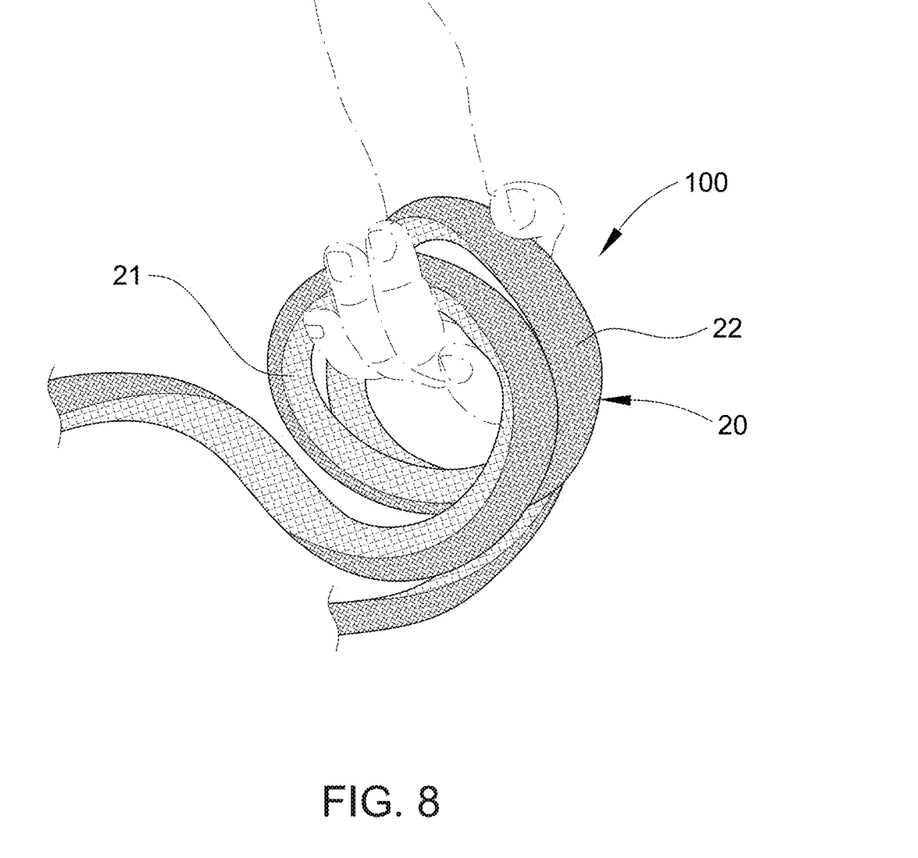
FIG. 8 is a schematic view of the water pipe device of the present disclosure when it is coiled for storage.

In some embodiments, as shown in FIG. 7, when the first wrapping portion 21 of the outer tube 10 is fully contracted, two wrinkle structures 225 will form in the second wrapping portion 22, each adjacent to the first connector 31 and the second connector 32 respectively. As shown in FIG. 7 and FIG. 8, when the water pipe device 100 of the present disclosure is regularly winded due to the driving of the outer tube 20 or is winded and folded by the user, two wrinkle structures 225 are respectively generated at the two ends of the second wrapping portion 22 of the outer tube 20, and the wrinkle structures 225 are adjacent to the first connector 31 and the second connector 32, respectively, while the other portions remain smooth. However, the disclosure is not limited thereto. The number and range of the wrinkle structures 225 in the second wrapping portion 22 of the outer tube 20 may vary depending on the elasticity and stretching variations of the first wrapping portion 21 of the outer tube 20.

To sum up, the advantages of the present disclosure may include:

Easy to fold and store. Through the elastic contraction design of the outer tube, the water pipe can automatically contract and wind regularly when not in use, making it convenient for the user to fold and store it.

Prevents tangling. Through the characteristic of unilateral elastic contraction of the outer tube, only one side of the outer tube contracts during contraction, thereby causing regular winding of the other side and the inner tube, which significantly reduces the likelihood of tangling or intertwining during use. As a result, the problem of tangling or knotting commonly associated with traditional expandable water pipe can be effectively solved.

What is claimed is:

1. A folding water pipe device, comprising:
   an inner tube made of elastic material, and the inner tube has a hollow interior;
   an outer tube wrapping around an outer circumference of the inner tube, wherein the outer tube consists of a first wrapping portion and a second wrapping portion, the first wrapping portion and the second wrapping portion are directly connected to each other along a radial direction of the outer tube, and the first wrapping portion and the second wrapping portion have different modulus of elasticities; and
   a connector structure having a first connector and a second connector, wherein the first connector connects to one end of the inner tube and the outer tube, and the second connector connects to the other end of the inner tube and the outer tube;
   wherein when the water pipe device is stretched by an external force, the first wrapping portion, the second wrapping portion and the inner tube are stretched simultaneously, and when the external force is released, the first wrapping portion is in a contracted state, causing the outer tube and the inner tube to wind regularly, and an actual length of the second wrapping portion is greater than an actual length of the first wrapping portion.

2. The folding water pipe device of claim 1, wherein the first wrapping portion is woven from a plurality of first warp yarns, a plurality of second warp yarns and a plurality of first weft yarns, the second wrapping portion is woven from a plurality of third warp yarns and a plurality of second weft yarns, wherein the first warp yarns, the second warp yarns, and the third warp yarns are arranged along an axial direction of the outer tube, and the first weft yarns and the second weft yarns are arranged along a circumferential direction of the outer tube; and
   wherein the first warp yarns are elastic stretchable materials, providing flexibility for the first wrapping portion to extend along the axial direction of the outer tube, and the second warp yarns, the first weft yarns, the third warp yarns and the second weft yarns are materials less elastic than the first warp yarns.

3. The folding water pipe device of claim 2, wherein when the water pipe device is stretched by the external force, the first warp yarns are in a stretched state, and when the external force is released, the first warp yarns elastically contract, causing the second wrapping portion to wind regularly.

4. The folding water pipe device of claim 2, wherein an interval between two adjacent first warp yarns is greater than an interval between two adjacent second warp yarns.

5. The folding water pipe device of claim 1, wherein the first wrapping portion has a first lateral edge and a second lateral edge parallel to an axial direction of the outer tube, the second wrapping portion has a third lateral edge and a fourth lateral edge parallel to the axial direction of the outer tube, the first lateral edge and the third lateral edge are connected to each other, and the second lateral edge and the fourth lateral edge are connected to each other.

6. The folding water pipe device of claim 1, wherein an actual length of the inner tube is substantially equal to a maximum length achievable by elastic stretching of the first wrapping portion.

7. The folding water pipe device of claim 1, wherein a modulus of elasticity of the second wrapping portion is greater than a modulus of elasticity of the first wrapping portion.

8. The folding water pipe device of claim 1, wherein when the first wrapping portion is in the contracted state, the second wrapping portion has at least one wrinkle structure, the at least one wrinkle structure has a plurality of bulges and a plurality of recesses, and the bulges and the recesses are arranged in an alternating pattern.

9. The folding water pipe device of claim 8, wherein when the first wrapping portion is in the contracted state, the second wrapping portion has two wrinkle structures adjacent to the first connector and the second connector, respectively.

10. The folding water pipe device of claim 1, wherein the outer tube is formed by interweaving axial yarns with radial yarns.

* * * * *